(12) United States Patent
Pouzin et al.

(10) Patent No.: US 8,938,510 B2
(45) Date of Patent: Jan. 20, 2015

(54) ON-DEMAND MAILBOX SYNCHRONIZATION AND MIGRATION SYSTEM

(75) Inventors: Dominic Justin Pouzin, Sammamish, WA (US); Geeman Yip, Kirkland, WA (US)

(73) Assignee: Bittan Inc., Kirkland, WA (US)

( * ) Notice: Subject to any disclaimer, the term of this patent is extended or adjusted under 35 U.S.C. 154(b) by 556 days.

(21) Appl. No.: 12/961,268

(22) Filed: Dec. 6, 2010

(65) Prior Publication Data

US 2011/0264748 A1  Oct. 27, 2011

Related U.S. Application Data

(60) Provisional application No. 61/328,003, filed on Apr. 26, 2010.

(51) Int. Cl.
| | | |
|---|---|---|
| *G06F 15/16* | (2006.01) | |
| *G06F 9/50* | (2006.01) | |
| *G06Q 10/10* | (2012.01) | |
| *H04L 12/58* | (2006.01) | |

(52) U.S. Cl.
CPC ............ *G06F 9/5011* (2013.01); *G06Q 10/107* (2013.01); *H04L 51/28* (2013.01)
USPC ........... 709/206; 709/200; 709/203; 709/205; 713/1; 713/100

(58) Field of Classification Search
CPC . G06F 9/5011; H04L 51/28; H04L 29/08072; H04L 29/06; H04L 29/06027; G06Q 10/107
USPC ......................................................... 709/206
See application file for complete search history.

(56) References Cited

U.S. PATENT DOCUMENTS

| | | | |
|---|---|---|---|
| 5,915,004 A | 6/1999 | Pabbati et al. | |
| 6,208,717 B1 | 3/2001 | Yeh et al. | |
| 6,502,191 B1 | 12/2002 | Smith et al. | |
| 6,735,691 B1 * | 5/2004 | Capps et al. ....................... | 713/1 |
| 7,320,068 B2 * | 1/2008 | Zimniewicz et al. ............. | 713/1 |
| 7,493,394 B2 | 2/2009 | Zavalkovsky | |
| 7,710,874 B2 | 5/2010 | Balakrishnan et al. | |
| 2002/0112007 A1 * | 8/2002 | Wood et al. ................... | 709/206 |
| 2002/0169907 A1 * | 11/2002 | Candea et al. ................. | 710/220 |
| 2004/0146147 A1 | 7/2004 | Picard et al. | |
| 2004/0267890 A1 * | 12/2004 | Soulet ........................... | 709/206 |
| 2005/0164703 A1 * | 7/2005 | Huynh ......................... | 455/432.3 |

(Continued)

OTHER PUBLICATIONS

The Windows Server Essentials and Small Business Server Blog SBS 2008—How to Export and Import Mailboxes To and From PST. Jan. 13, 2009.*

*Primary Examiner* — Tauqir Hussain
(74) *Attorney, Agent, or Firm* — Dorsey & Whitney LLP

(57) ABSTRACT

A system for managing physical and logical resources to provide on-demand synchronization or migration of mailboxes and their corresponding content. Physical resources are managed by automatically assigning mailbox processing tasks to either reserved computing resources, or computing resources dynamically obtained from cloud computing services. Authentication resources are managed by automatically requesting credentials from users, accepting submitted credentials, and initiating mailbox processing tasks.

27 Claims, 11 Drawing Sheets

(56) References Cited

U.S. PATENT DOCUMENTS

| | | | |
|---|---|---|---|
| 2005/0246518 A1* | 11/2005 | Takahashi | 713/2 |
| 2005/0267938 A1* | 12/2005 | Czeczulin | 709/206 |
| 2006/0173908 A1* | 8/2006 | Browning et al. | 707/104.1 |
| 2007/0073573 A1* | 3/2007 | Gerhard et al. | 705/9 |
| 2008/0243930 A1* | 10/2008 | Browning et al. | 707/104.1 |
| 2010/0036923 A1 | 2/2010 | Byrne et al. | |
| 2011/0055712 A1* | 3/2011 | Tung et al. | 715/738 |
| 2014/0149517 A1 | 5/2014 | Greinhofer et al. | |

\* cited by examiner

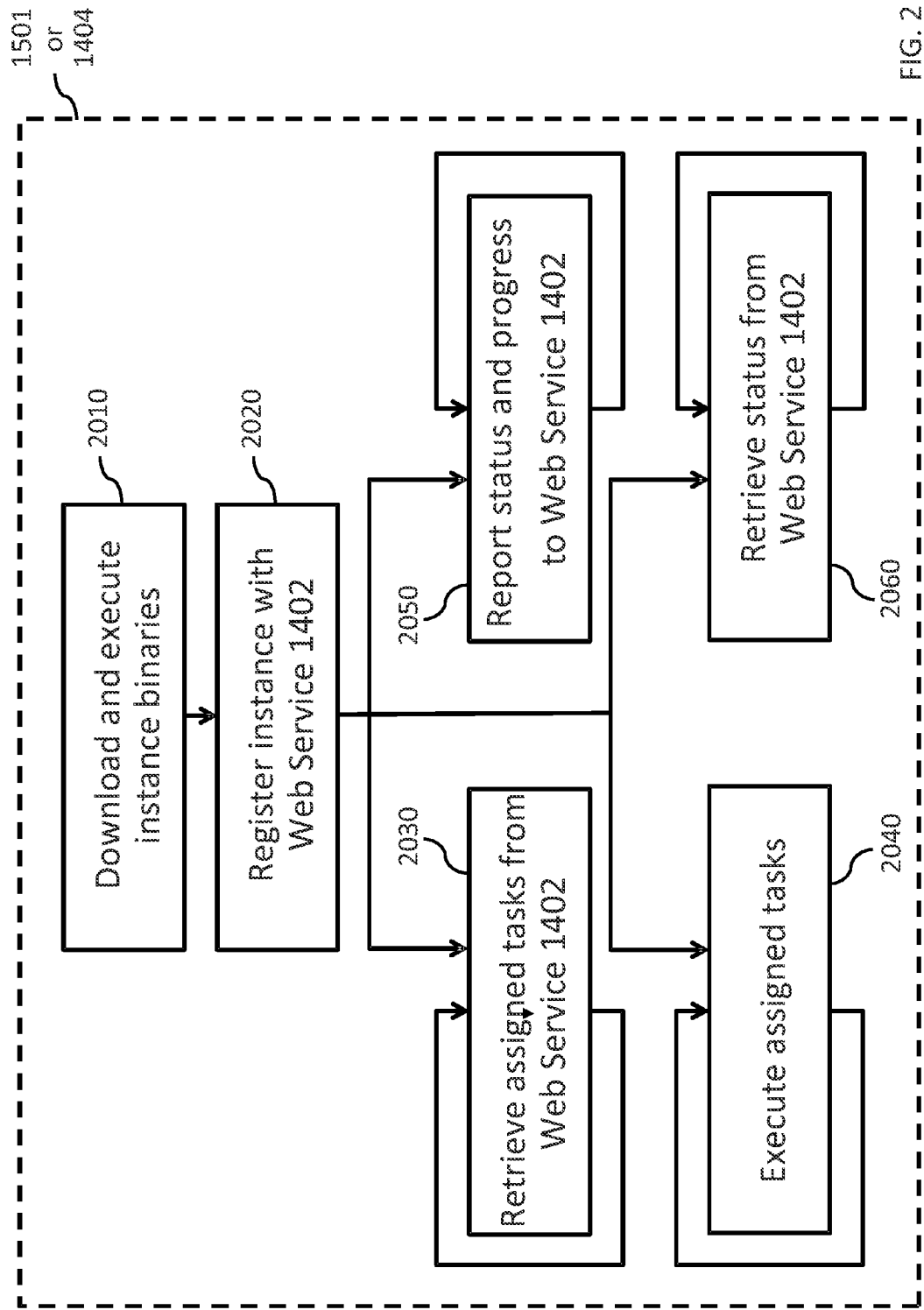

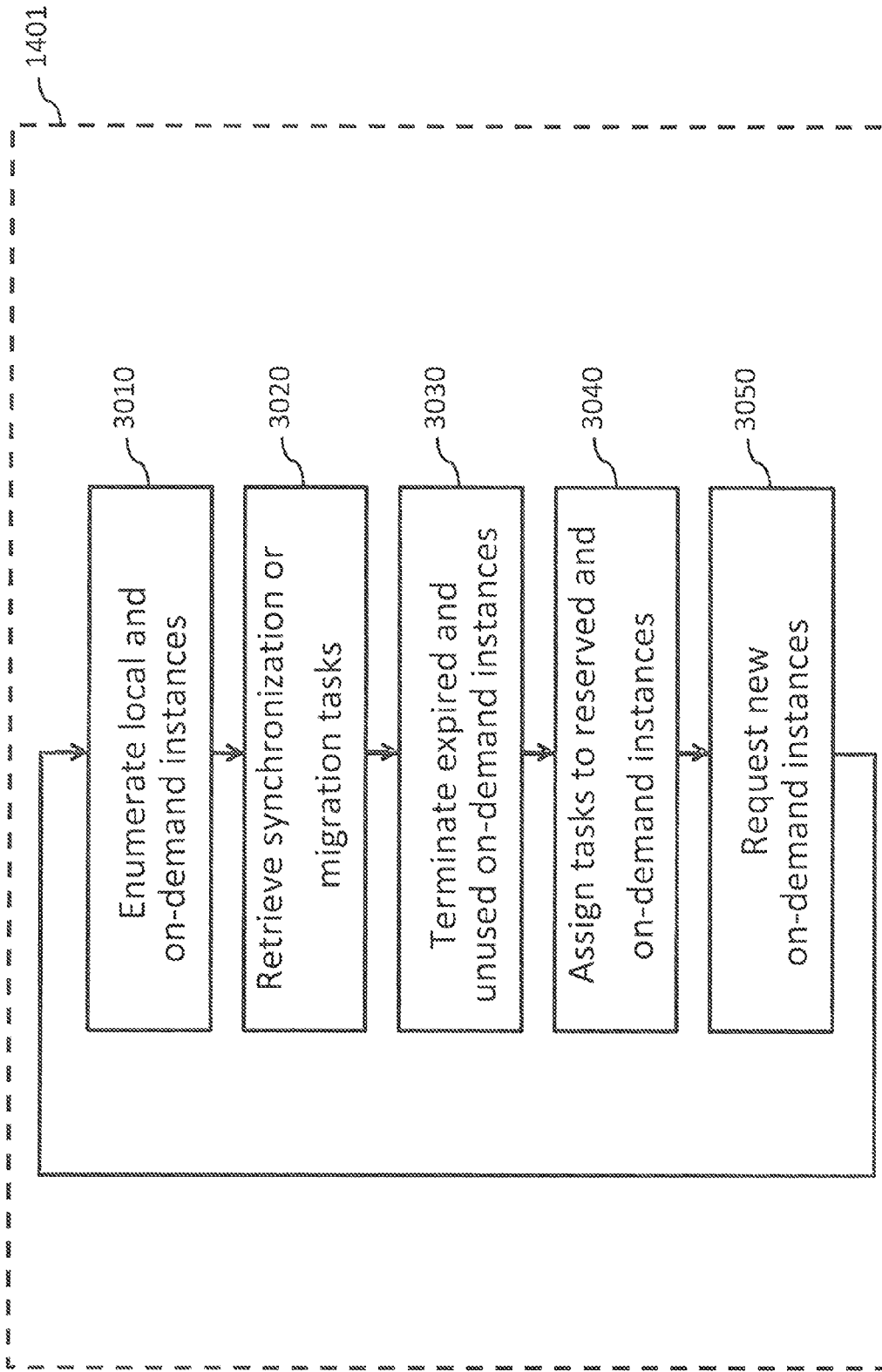

ON-DEMAND MAILBOX SYNCHRONIZATION AND MIGRATION SYSTEM

CROSS REFERENCE TO RELATED APPLICATION

This application claims the benefit of U.S. Provisional Application, titled "ON-DEMAND MAILBOX SYNCHRONIZATION AND MIGRATION SYSTEM," Ser. No. 61/328,003 filed on Apr. 26, 2010, the benefit of which is hereby claimed under 35 U.S.C. §119(e), and which is further incorporated herein by reference.

FIELD OF THE INVENTION

The invention is generally directed to electronic messaging systems, and more particularly, bi-directional synchronization and uni-directional migration of messaging system content between a source messaging system and a destination messaging system e.g., e-mails, instant messages, texts, chats, contacts, tasks, appointments, and the like.

BACKGROUND OF THE INVENTION

Conventional synchronization or migration of mailbox accounts between source and destination messaging systems, often employs specialized software that is installed on a predefined set of computing resources, each connected to one or more networks. As a result, the available networking and computing resources for synchronization and/or migration is limited to the installation base. Often, relatively cumbersome capacity planning is required to determine the adequate number and location of computing resources to ensure timely synchronization or migration.

Because computing resource requirements often change, over or under utilization of these resources can be an issue. For example, as a migration progresses, resource requirements may decrease with the amount of mailbox content left to migrate. Conversely, resource requirements may increase as new migrations are requested. Because conventional systems do not dynamically adapt to changing resource requirements, cumbersome manual intervention may be required to deploy new computers and increase capacity, or free assigned computers and reclaim unused resources.

Further, depending on the number and size of mailbox accounts to process, synchronization or migration may require large amounts of information to be transmitted between source and destination messaging systems. Because of limited networking resources, conventional systems may experience issues such as limited bandwidth, throttled connections, or blocked IP addresses, resulting in slow or failed synchronizations or migrations.

Further, synchronization or migration may require large amounts of computing resources for processor intensive activities such as authenticating connections or converting, analyzing, or indexing mailbox account content. Because of limited computing resources, conventional systems may experience issues such as insufficient processing capacity, resulting in slow or failed synchronizations or migrations.

Further, synchronization or migration may require access to a large number of credentials to connect to a plurality of mailbox accounts. This is particularly true when a messaging system does not support administrative access to all mailboxes, or administrative credentials are unknown, and only a potentially large number of individual users have knowledge of authentication credentials.

BRIEF DESCRIPTION OF THE DRAWING

FIG. 2 illustrates a flowchart for processing mailbox accounts;

FIGS. 3-7 show flowcharts for providing management of mailbox account resource tasks.

DETAILED DESCRIPTION

The invention is a system for dynamically managing physical and logical resources to provide on-demand synchronization or migration of mailbox accounts and their corresponding content. Physical resources are managed by automatically assigning mailbox processing tasks to either reserved computing resources, or computing resources dynamically obtained from cloud computing services. Authentication resources are managed by automatically requesting credentials from users, accepting submitted credentials, and initiating mailbox processing tasks.

Figure 1A:
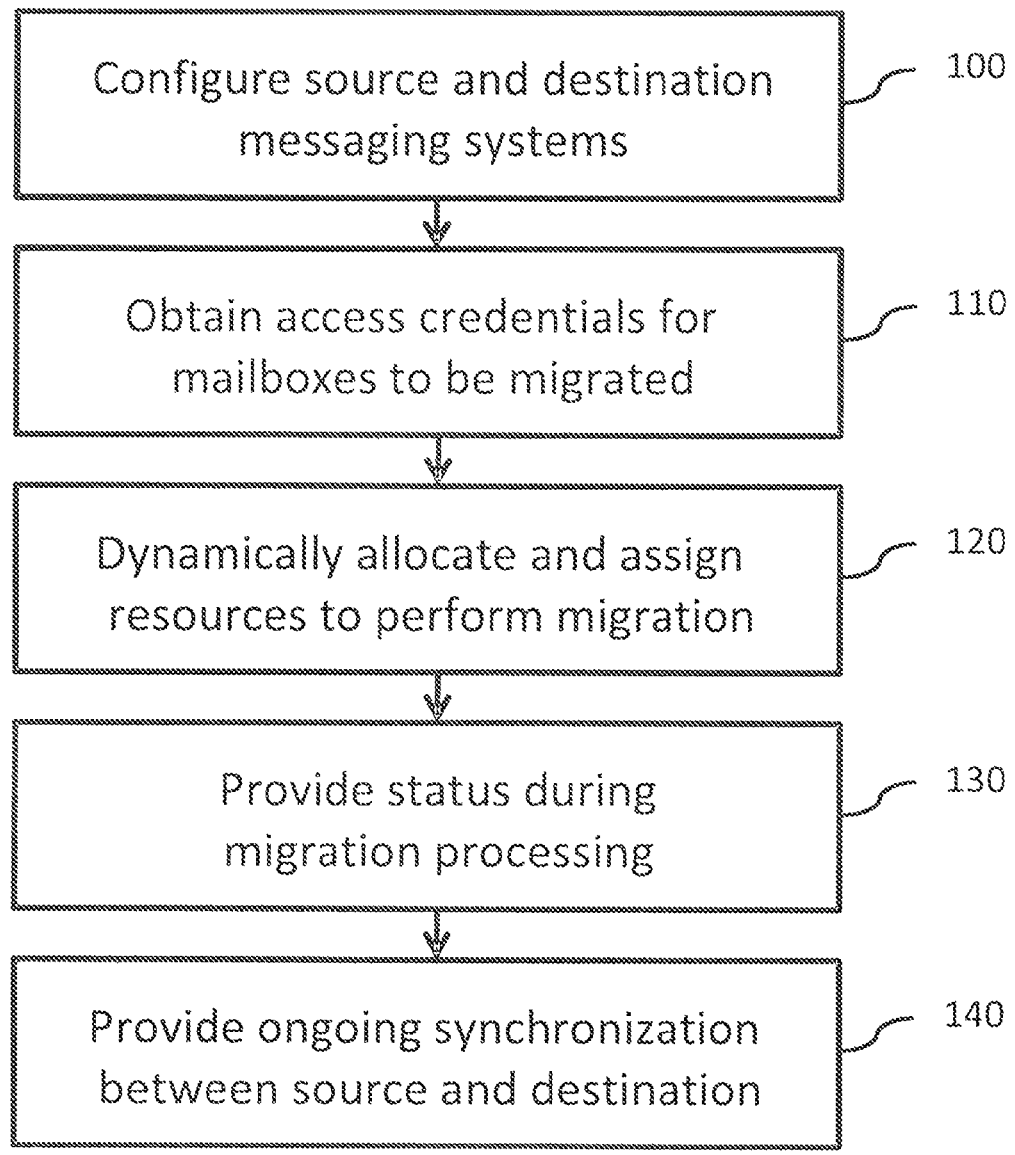
FIG. 1A illustrates an overview of a flowchart for providing on-demand mailbox account migration from a source messaging system to a destination messaging system.

Turning to FIG. 1A, a high-level overview of the steps used to provide on-demand migration is shown. At step 100, the source and destination messaging systems are configured. During configuration, information about server location, access credentials, a list of mailboxes to process, and additional processing options may be provided. At step 110, access credentials are obtained by automatically requesting credentials from individual mailbox users. This step is not required if administrative access to user mailboxes is available, or if mailbox credentials were already specified during configuration. At step 120, mailbox migration processing tasks are assigned to computing resources. If computing resources are insufficient or unavailable, new computing resources are dynamically allocated. At step 130, status information is provided during mailbox migration processing. Status information allows authorized users to monitor mailbox migrations, but also provides information about the availability of, and workload associated with each computing resource. At step 140, ongoing synchronization between source and destination messaging systems may be provided as an option.

Figure 1B:
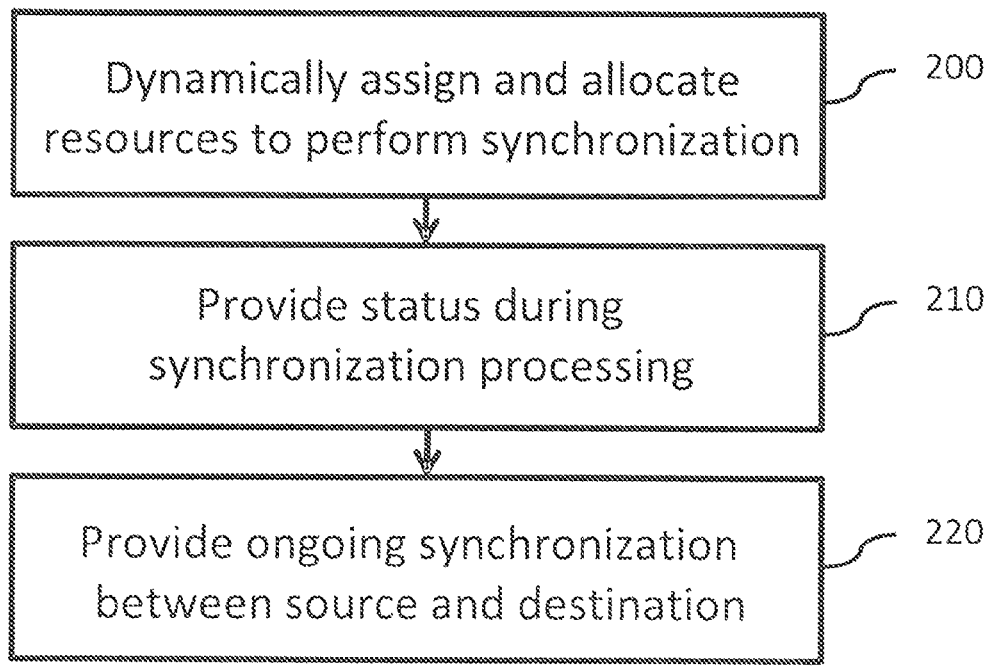
FIG. 1B shows an overview of a flowchart for providing on-demand mailbox account synchronization.

Turning to FIG. 1B, a high-level overview of the steps used to provide on-demand synchronization is shown. At step 200, mailbox synchronization processing tasks are assigned to computing resources. If computing resources are insufficient or unavailable, new computing resources are dynamically allocated. At step 210, status is provided during mailbox synchronization processing. Processing status information allows authorized users to monitor mailbox synchronizations, but also allows the system to determine the availability of computing resources. At step 220, ongoing synchronization between source and destination messaging systems is provided. Ongoing synchronization ensures that changes effected to the source or destination mailbox are replicated in a bi-directional manner.

Figure 1C:
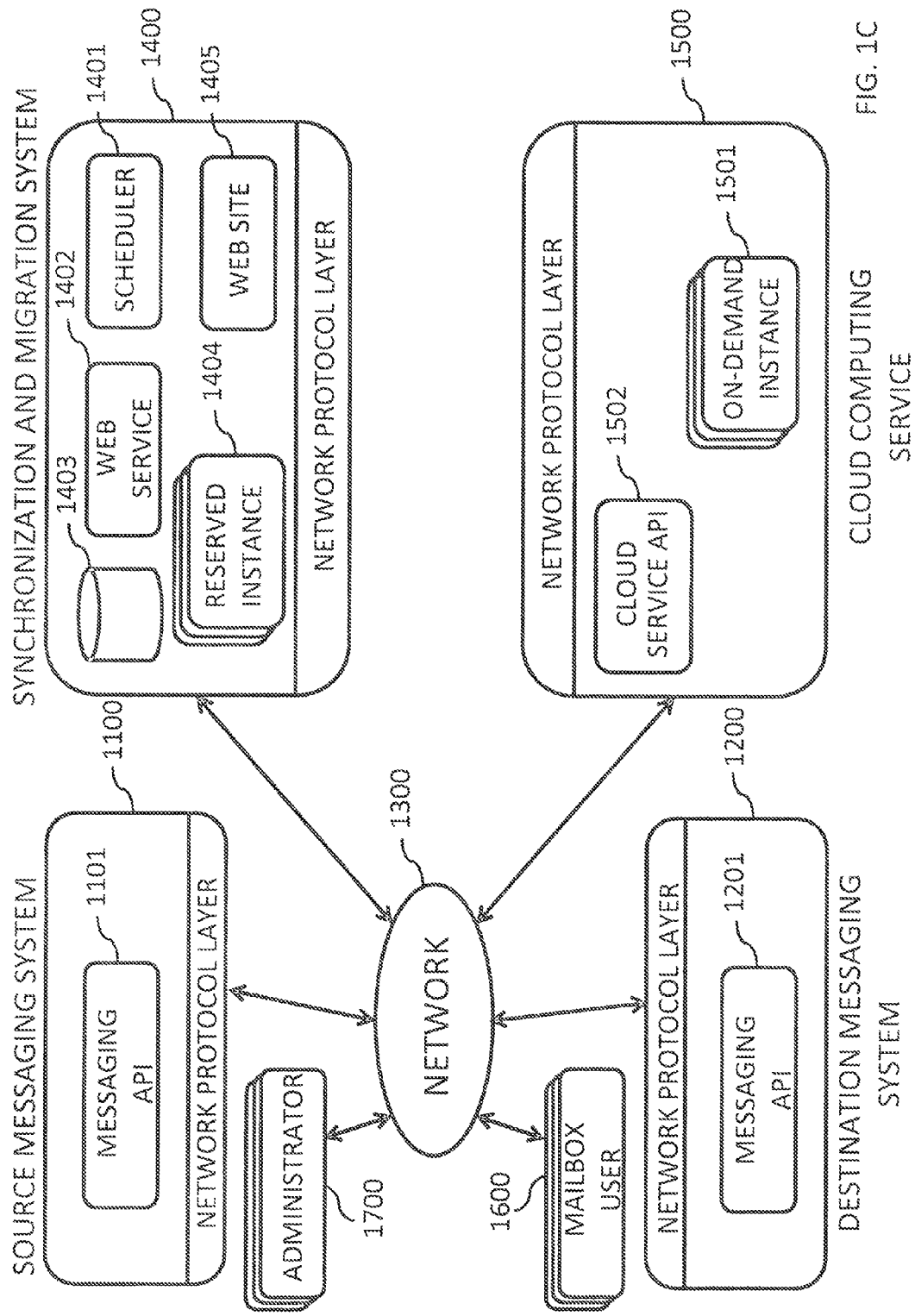
FIG. 1C illustrates an architecture for a network and several components to implement at least one embodiment of the invention.

Turning to FIG. 1C, there is shown a source messaging system 1100 which provides a messaging API 1101, and a destination messaging system 1200 which provides a messaging API 1201. There is also shown a synchronization and migration system 1400 which includes a scheduler 1401, a web service 1402, a configuration repository 1403, one or more reserved instances 1404, and a web site 1405. There is also shown a cloud computing service 1500 providing access to one or more on-demand instances 1501 using a cloud service API 1502. There is also shown one or more mailbox users 1600, and one or more administrators 1700. There is also shown a network 1300 which is a distributed network such as the Internet. Further, each of source messaging system 1100, destination messaging system 1200, synchronization and migration system 1400, and cloud computing service 1500 may operate on one or more computer devices, or similar apparatuses, with memory, processors, and storage devices. For example, a network device such as described below in conjunction with FIG. 1D may be employed to implement one or more of source messaging system 1100, destination messaging system 1200, synchronization and migration system 1400, and cloud computing service 1500.

In further detail, still referring to FIG. 1, source messaging API 1101 and destination messaging API 1201 are accessible from network 1300. Source messaging API 1101 and destination messaging API 1201 typically require authentication, and may implement one or more messaging protocols including but not limited to POP3, IMAP, Delta Sync, MAPI, Gmail, Web DAV, EWS, etc. It should be appreciated that while source and destination roles may remain fixed during migration, they may alternate during synchronization. The synchronization or migration process consists in using messaging APIs to copy mailbox content from source to destination, including but not limited to e-mails, contacts, tasks, appointments, etc. Additional operations may be performed, including but not limited to checking for duplicates, converting content, creating folders, translating e-mail addresses, etc. In the present invention, synchronization and migration system 1400 manages synchronization and migration resources.

Synchronization and migration system 1400 implements web service 1402 and web site 1405, allowing authorized users to submit mailbox processing tasks and monitor their status. Mailbox processing tasks will be referred to as tasks later herein. For programmatic task submission and monitoring, web service 1402 is more suitable because it implements a programmatic interface. For human-based task submission and monitoring, web site 1405 is more suitable because it implements a graphical user interface in the form of web pages. Before a task can be processed, configuration information about source and destination messaging systems 1100 and 1500 must be provided. Additional processing criteria may be specified as well, including but not limited to a list of mailbox object types or folders to process, a date from which processing can start, a specification mapping source and target mailbox folders, a maximum number of mailbox items to process, etc. As will be described in more detail later herein, configuration information may also include administrative or user mailbox credentials. Submitted tasks and configuration information are stored in configuration repository 1403, which may use a persistent location such as a database or files on disk, or a volatile one such as memory.

Synchronization and migration system 1400 implements scheduler 1401 which has access to information in configuration repository 1403. Scheduler 1401 is responsible for allocating and managing computing resources to execute tasks. For this purpose, scheduler 1401 may use reserved instances 1404, which are well-known physical or virtual computers, typically but not necessarily in the same Intranet. In addition, scheduler 1401 may use on-demand instances 1501, which are physical or virtual computers dynamically obtained from one or more cloud service providers 1500, including but not limited to MICROSOFT AZURE from MICROSOFT CORPORATION of Redmond, Wash., or AMAZON WEB SERVICES from AMAZON.COM INC. of Seattle, Wash. Depending on the implementation, only reserved instances, only on-demand instances, or a combination of the two may be used. A possible implementation of the logic used to select and allocate instances will be described later herein.

Scheduler 1401 monitors the status of instances 1404 and 1501. To obtain status information, scheduler 1401 may use cloud service API 1502, require instances 1404 and 1501 to report their status by calling into web service 1403, or connect directly to instances 1404 and 1501. Monitored characteristics may include but are not limited to IP address, last response time, geographical location, processing capacity, network capacity, memory load, processor load, network latency, operating system, execution time, processing errors, processing statistics, etc. Scheduler 1401 may use part or all of this information to assign tasks to instances 1404 and 1501, terminate them, or allocate new ones. A possible implementation of scheduler 1401 will be described later herein.

While reserved instances 1404 may be pre-configured, on-demand instances 1501 are dynamically allocated, and must be configured to run intended binary code using cloud service API 1502. In a possible implementation, on-demand instances 1501 may boot with an initial image, which then downloads and execute binaries from a well-known location such as web service 1402 or web site 1405, but other locations are possible. After being configured to run intended binary code, instances 1404 and 1501 may use web service 1403 to periodically retrieve assigned tasks including corresponding configuration information. In other implementations, scheduler 1401 may directly assign tasks by directly communicating with instances 1404 and 1501 instead of requiring them to poll. A possible implementation of instances 1404 and 1501 will be described later herein.

To facilitate authentication to messaging systems 1100 and 1200, an administrator 1700 may provide administrative credentials using web service 1402 or web site 1405, which are then stored in configuration repository 1403. Administrative credentials are subsequently transmitted to instances 1404 and 1501, allowing them to execute assigned tasks. However, administrative credentials may be unavailable, either because messaging systems 1100 or 1400 do not support administrative access, or because administrative credentials are unknown.

To address this issue, scheduler 1401 may automatically contact mailbox users 1600 and request that they submit mailbox credentials. While different types of communication mechanisms are possible, the scheduler may send e-mail messages to mailbox users 1600 requesting that they submit mailbox credentials. This approach is facilitated by the fact that configuration 1402 contains a list of source and destination mailboxes, including e-mail addresses. In some implementations, scheduler 1401 may send periodic requests for mailbox credentials until supplied by mailbox users. In some implementations, scheduler 1401 may also include a URL link to web site 1405, allowing mailbox users to securely submit credentials over network 1300. Scheduler 1401 may detect when new mailbox credentials have become available, and uses this information to assign executable tasks to instances 1404 and 1501.

Figure 1D:
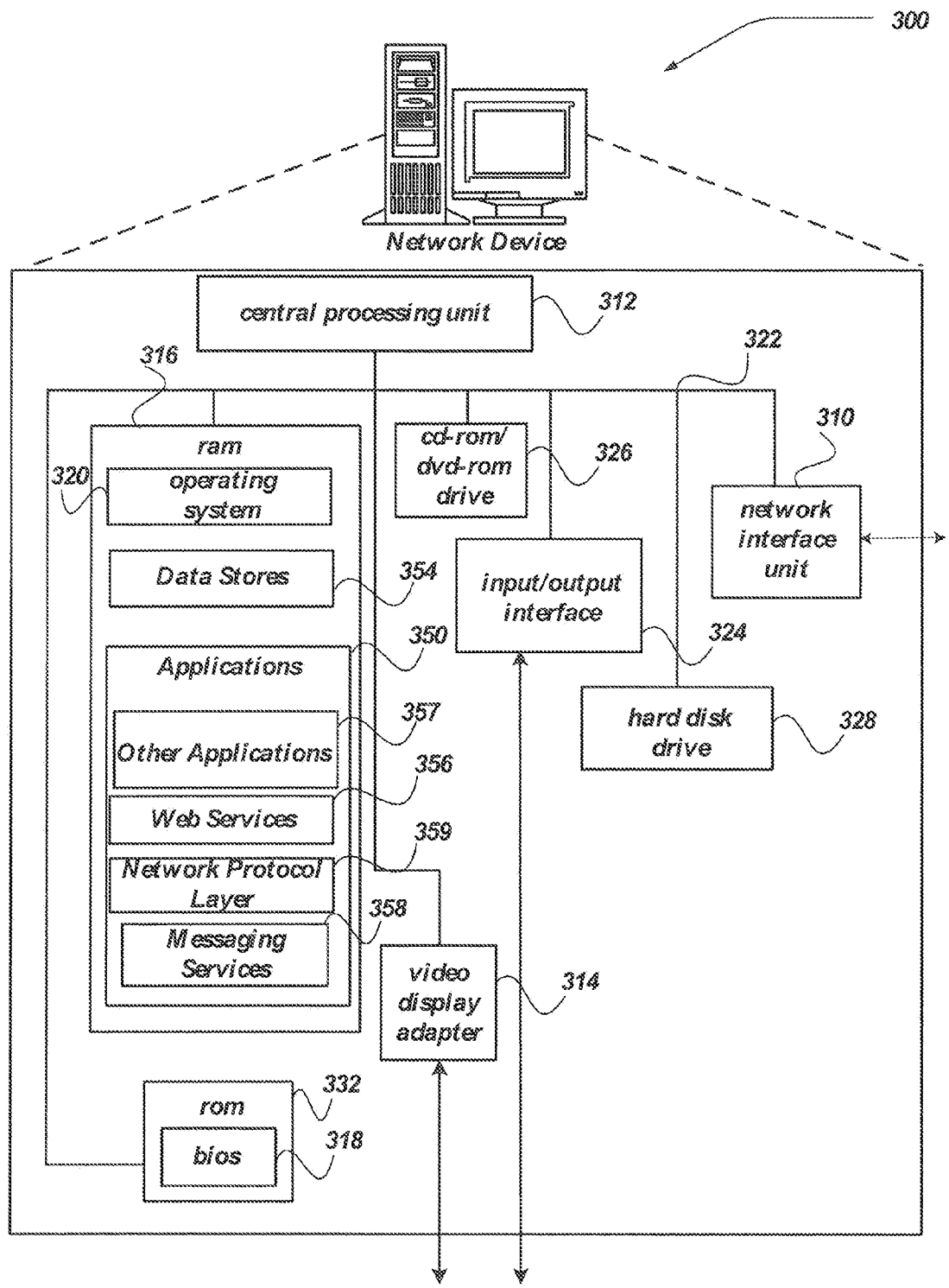
FIG. 1D shows a block diagram of a network device.

FIG. 1D shows one embodiment of a network device 300, according to one embodiment of the invention. Network device 300 may include many more or less components than those shown. The components shown, however, are sufficient to disclose an illustrative embodiment for practicing the invention. Network device 300 may represent one or more of source messaging system 1100, destination messaging system 1200, synchronization and migration system 1400, and cloud computing service 1500, as described above.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 1D, network device 300 also can communicate with the Internet, or some other communications network, via network interface unit 310, which is constructed for use with various communication protocols including the TCP/IP protocol, and/or through the use of Network Protocol Layer 359, or the like. Network interface unit 310 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical, non-transitory medium which can be used to store the desired information and which can be accessed by a computing device.

As shown, data stores 354 may include a database, text, spreadsheet, folder, file, or the like, that may be configured to maintain and store various content. Data stores 354 may also operate as configuration repository 1403 of FIG. 1C, for example. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 356, messaging services 358, and Network Protocol Layer 359, may also be included as application programs within applications 350. However, the invention is not limited to these non-limiting examples, and other applications may also be included, included those discussed above in conjunction with FIG. 1C.

Messaging services 358 may include virtually any computing component or components configured and arranged to forward messages from message user agents, and/or other message servers, or to deliver messages to a local message store, such as data store 354, or the like. Thus, messaging services 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging services 358 may be configured to manage SMS messages, IM, MMS, IRC, RSS feeds, mIRC, or any of a variety of other message types. In one embodiment, messaging services 358 may enable users to initiate and/or otherwise conduct chat sessions, VoIP sessions, or the like. Messaging services 358 may further operate to provide a messaging API, such as Messaging API 1101 of FIG. 1C.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. Web services 356 may operate to provide services such as described elsewhere for Web service 1402 of FIG. 1C.

Network Protocol Layer 359 represents those applications useable to provide communications rules and descriptions that enable communications in or between various computing devices. Such protocols, include, but are not limited to signaling, authentication, error detection and correction capabilities. In one embodiment, at least some of the applications for which Network Protocol Layer 359 represents may be included within operating system 320, and/or within network interface unit 310.

Turning to FIG. 2, additional details regarding an implementation of instances 1501 and 1404 are provided. The routine begins at operation 2010, during which the instance may check if binaries required for execution are present and up to date. If this is not the case, binaries may be downloaded from a well-known location, installed, and then executed. It should be appreciated that execution of downloaded binaries may require launching a new process. Also, the instance may be pre-configured with a specific version of binaries, in which case operation 2010 may be skipped.

At operation 2020, the instance may call into web service 1402 to request registration with configuration repository 1403 and indicate it is available for processing. This procedure will be referred to as registration process later herein. Information passed as part of the registration process may include some or all previously described monitoring characteristics. From operation 2020, the routine proceeds to several concurrent loops, each executing operation 2030, 2040, 2050, and 2060 respectively.

At operation 2030, the instance may periodically call into web service 1402 to retrieve new tasks assigned by scheduler 1401 to the current instance. Available information may include all configuration information required to perform the task, including information about the target mailbox, the location of source and target systems, and required mailbox credentials. When a new task is found, the instance may notify operation 2040 that it should process it.

At operation 2040, the instance may execute tasks following notifications from operation 2030, and perform various synchronization or migration operations. During execution, progress and error information may be generated. For example, this may include the number of items migrated so far, a list of errors encountered during processing, or the fact that task execution completed, but other indicators are possible.

At operation 2050, the instance may read progress and error information generated by operation 2040, and may periodically call into web service 1402 to publish this information to configuration repository 1403. Even if no new progress or error information is available, the instance may periodically call into web service 1402 to inform it that it still running. As a result, the last response time for the registered instance may be updated in configuration repository 1403. This information may be used by scheduler 1401 to detect unresponsive instances, as will be described later herein.

At operation 2060, the instance periodically may call into web service 1402 to retrieve task status information. Web service 1402 and web site 1405 may allow authorized users to change a task's status, for example to stop or restart it. When a task's status changes, the instance may notify operation 2040 so that it can take action. For example, if a task's status indicates that processing should be stopped, operation 2040 may be notified, and synchronization or migration may be aborted.

It should also be appreciated that executing operations 2030, 2040, 2050, and 2060 concurrently makes it possible for synchronization or migration execution not to be interrupted by calls to web service 1402. However, other implementations may use a different concurrency model, for example a single thread. Also, it should be appreciated that one possible notification mechanism is to use in-memory events to signal notifications, and local files to exchange data. While other implementations are possible, it is preferable to use methods which ensure processing can resume gracefully should the instance be accidentally or intentionally restarted.

Turning to FIG. 3, additional details regarding an implementation of scheduler 1401 are provided. The routine consists in a loop executed periodically, which begins at operation 3010, during which the scheduler may enumerate reserved and on-demand instances. At operation 3020, the scheduler may retrieve tasks from web service 1402. At operation 3030, the scheduler may terminate expired and unused on-demand instances. At operation 3040, the scheduler may assign tasks to valid instances. At operation 3050, the scheduler may request new on-demand instances if it found during operation 3040 that available resources were insufficient.

Figure 4:
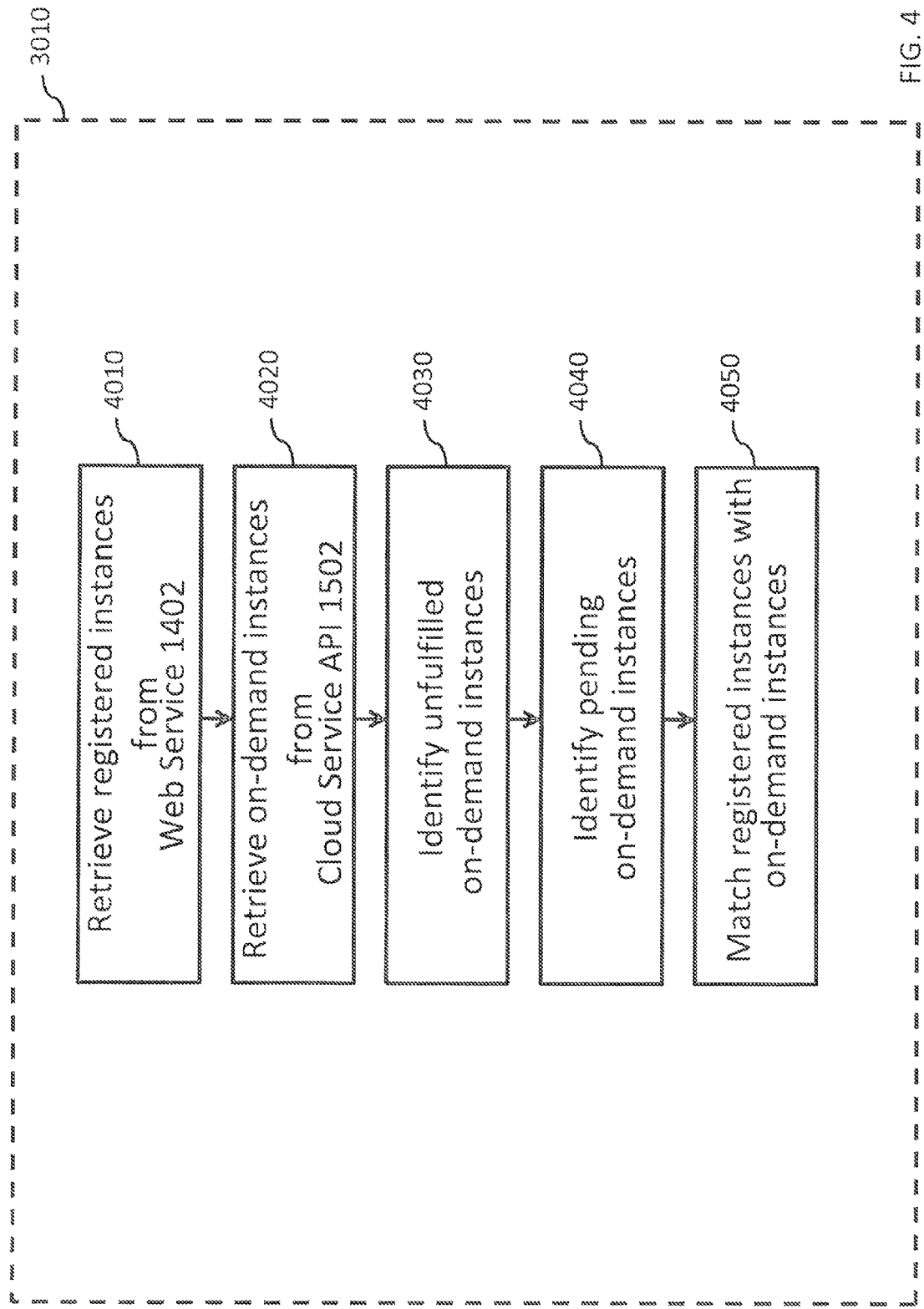

Turning to FIG. 4, additional details regarding an implementation of scheduler operation 3010 are provided. The routine begins at operation 4010, during which the scheduler may retrieve registered instances from configuration repository 1403 using a call to web service 1402. Registered instances consist of reserved instances 1404 and on-demand instances 1501 which have completed the registration process previously described herein.

At operation 4020, the scheduler may use cloud service API 1502 to enumerate all on-demand instances and their states. Most cloud computing services 1500 provide a way to report the state of instances, such as requested, started, failed, canceled, or terminated. Actual states depend on the lifecycle of instances as implemented by cloud computing service 1500.

At operation 4030, the scheduler may use the result of operation 4020 to identify unfulfilled on-demand instances. Unfulfilled on-demand instances are instances which have been requested from cloud computing service 1500, but have not yet advanced to an executable state. Indeed, there often is a delay between the time an on-demand instance is requested and the time it becomes available, for example because the instance must first receive an image and boot.

At operation 4040, the scheduler may use the result of operation 4020 to identify pending on-demand instances. Pending on-demand instances are instances which have advanced to an executable state, but haven't completed the registration process. Indeed, there often is a delay between the time an on-demand instance starts, and the time it completes registration process, for example because it must first download binaries and call into web service 1402.

At operation 4050, the scheduler may match cloud service instances which registered on-demand instances, for example by matching IP addresses. For example, cloud service API 1502 may return the IP address of each running instance, while the registration process may store the IP address of registering instance in configuration repository 1403. As a result of the matching process, the scheduler may identify which on-demand instances have completed the registration process, and which have not.

Figure 5:
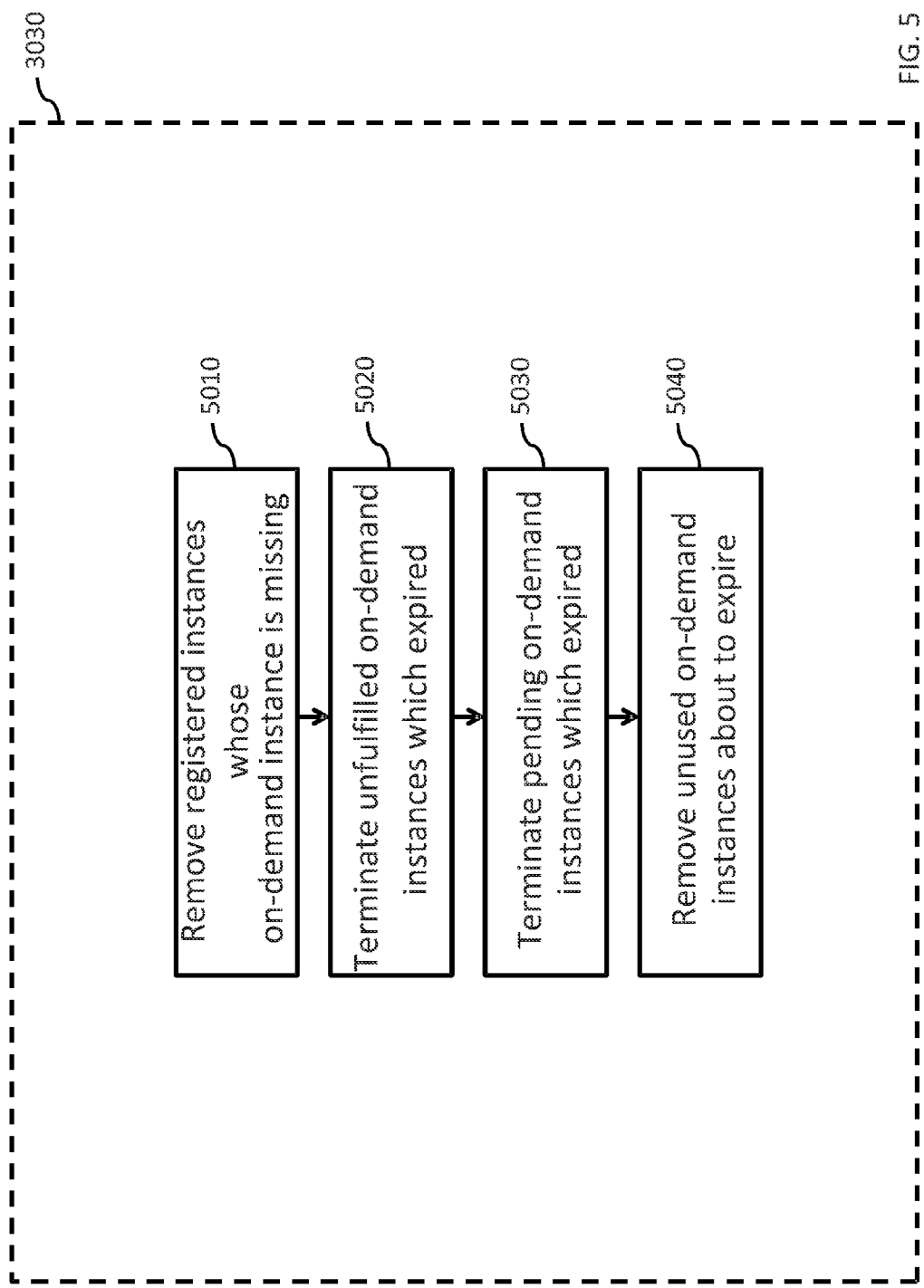

Turning to FIG. 5, additional details regarding an implementation of scheduler operation 3030 are provided. The routine begins at operation 5010, during which the scheduler may use the result of operation 4050 to identify on-demand instances registered in configuration repository 1403, but which cloud service API 1502 reports as missing, unavailable, canceled, failed, or terminated. This may happen if a new on-demand instance was started, completed the registration process, but for example was terminated. For those instances, the scheduler removes corresponding registration information from configuration repository 1403.

At operation 5020, the scheduler may use the result of operation 4030 to identify on-demand instances which remained unfulfilled for a time period exceeding a configurable value. This may happen if a request for a new on-demand instance could not be satisfied by cloud computing service 1500 within a reasonable amount of time, for example due to system downtime. For those instances, the scheduler sends a cancellation request to cloud service API 1502.

At operation 5030, the scheduler may use the result of operation 4040 to identify on-demand instances which remained pending for a time period exceeding a configurable value. This may happen if a new on-demand instance advanced to an executable state as reported by cloud service API 1502, but failed to complete the registration process, for example because it was unable to download binaries. For those instances, the scheduler sends a termination request to cloud service API 1502.

At operation 5040, the scheduler may identify on-demand instances which have no task assigned to them, and whose paid-for time slot is about to expire. For example, if cloud computing service 1500 uses a per-hour pricing model, on-demand instances with no task assigned to them may be terminated a few minutes before the current paid-for hour expires. This provision ensures that computing resources remain available until the paid-for lease expires. For those instances, the scheduler sends a termination request to cloud service API 1502.

Figure 6:
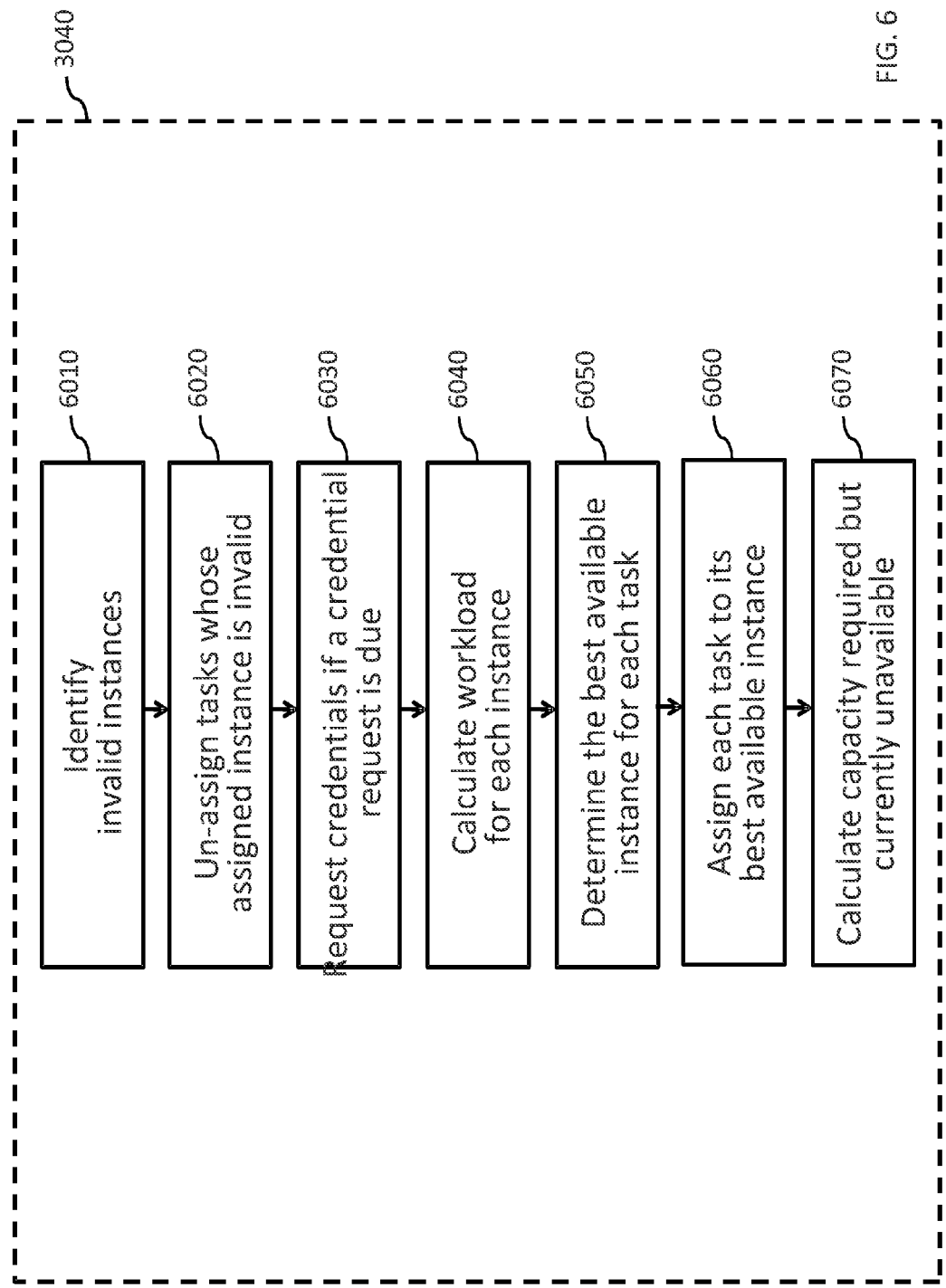

Turning to FIG. 6, additional details regarding an implementation of scheduler operation 3040 are provided. The routine begins at operation 6010, during which the scheduler may identify invalid instances. Invalid instances may include instances which are no longer registered in configuration repository 1403, instances whose last response time in configuration repository 1403 is older than a configurable value, instances which have reported they cannot continue execution, etc.

At operation 6020, the scheduler may use the result of operation 6010 to find tasks whose assigned instance is invalid, and un-assign them. Depending on the implementation, the un-assignment may be performed only in memory, or persisted to configuration repository 1403 using a call to web service 1402. In both cases, such tasks qualify for re-assignment. On advantage of persisting un-assignment is that instances can use web service 1402 to detect un-assignment, and take actions such as closing connections or releasing memory.

At operation 6030, the scheduler may determine if a task requires mailbox credentials to be provided. If so, the scheduler decides whether a request for mailbox credentials should be sent. To ensure requests are sent to users at regular intervals, the date at which the last request was sent may be persisted, for example in configuration repository 1403 using a call to web service 1402. In addition to a time interval, other parameters may be used, including but not limited to a maximum number of requests to send per user, a date range restricting when requests can be sent, etc.

At operation 6040, the scheduler may calculate the workload associated with each instance. In one implementation, to measure workload, the scheduler may simply count the number of tasks assigned to each instance. However, other methods are possible. For example, the scheduler could use a more sophisticated method taking into consideration progress information published by operation 2050 and stored in configuration repository 1403, for example processor and memory load.

At operation 6050, the scheduler may identify tasks which are unassigned and can execute. Whether a task can execute may depend on whether required mailbox credentials have been provided. It may also depend on other parameters, including but not limited to a date range restricting execution time, a maximum number of connections allowed to a messaging system, etc. For each unassigned task which can execute, the scheduler determines the best available instance.

It should be appreciated that several mechanisms for selecting the best available instance are possible. In most cases, the mechanism employed will use workload information produced by operation 6040, and instance capacity information stored in configuration repository 1403. In a possible implementation, the scheduler first considers valid reserved instances whose current workload is less than their respective capacity. Among those, the scheduler selects the reserved instance with the lowest workload to capacity ratio. In other terms, the scheduler favors the least busy available reserved instance. Because reserved instances are dedicated resources, the scheduler tries to distribute tasks evenly between them.

However, if no such reserved instance is available, the scheduler considers valid on-demand instances whose current workload is less than their respective capacity. Among those, the scheduler selects the instance with the highest workload to capacity ratio. In other terms, the scheduler favors the most busy available on-demand instance. Because on-demand instances are often paid for based on utilization time, the scheduler tries to assign as many tasks as possible to each on-demand instance. In addition, options stored in configuration repository 1403 may affect assignment. For example, an option may specify that a particular task should execute only on reserved instances, or execute only in a particular geographic location to comply with data transmission legislation or to improve performance.

At operation 6060, the scheduler may use the result of operation 6050 to assign each such task to its best possible instance, and may store assignment information in configuration repository 1403 using a call to web service 1402. Further, as part of the assignment process, the scheduler may also reassign tasks. For example, the scheduler may reassign tasks from on-demand instances to reserved instances if it found that some reserved instances became available. One reason for doing this is to reduce costs associated with running on-demand instances in addition to reserved instances. Indeed, reserved instances can be seen as a fixed cost, while on-demand instances can be seen as an additional cost.

At operation 6070, the scheduler may identify tasks which could not be assigned to an on-demand instance, for example because all on-demand instances were over capacity. The scheduler may then calculate a value called the insufficient processing capacity, which in one implementation may simply be the number of tasks which could not be assigned during a scheduling cycle. More sophisticated measures based on the amount of work to be performed by each unassigned task are also possible. For example, in one implementation, the size of each mailbox to process may be used to calculate the insufficient processing capacity.

Figure 7:
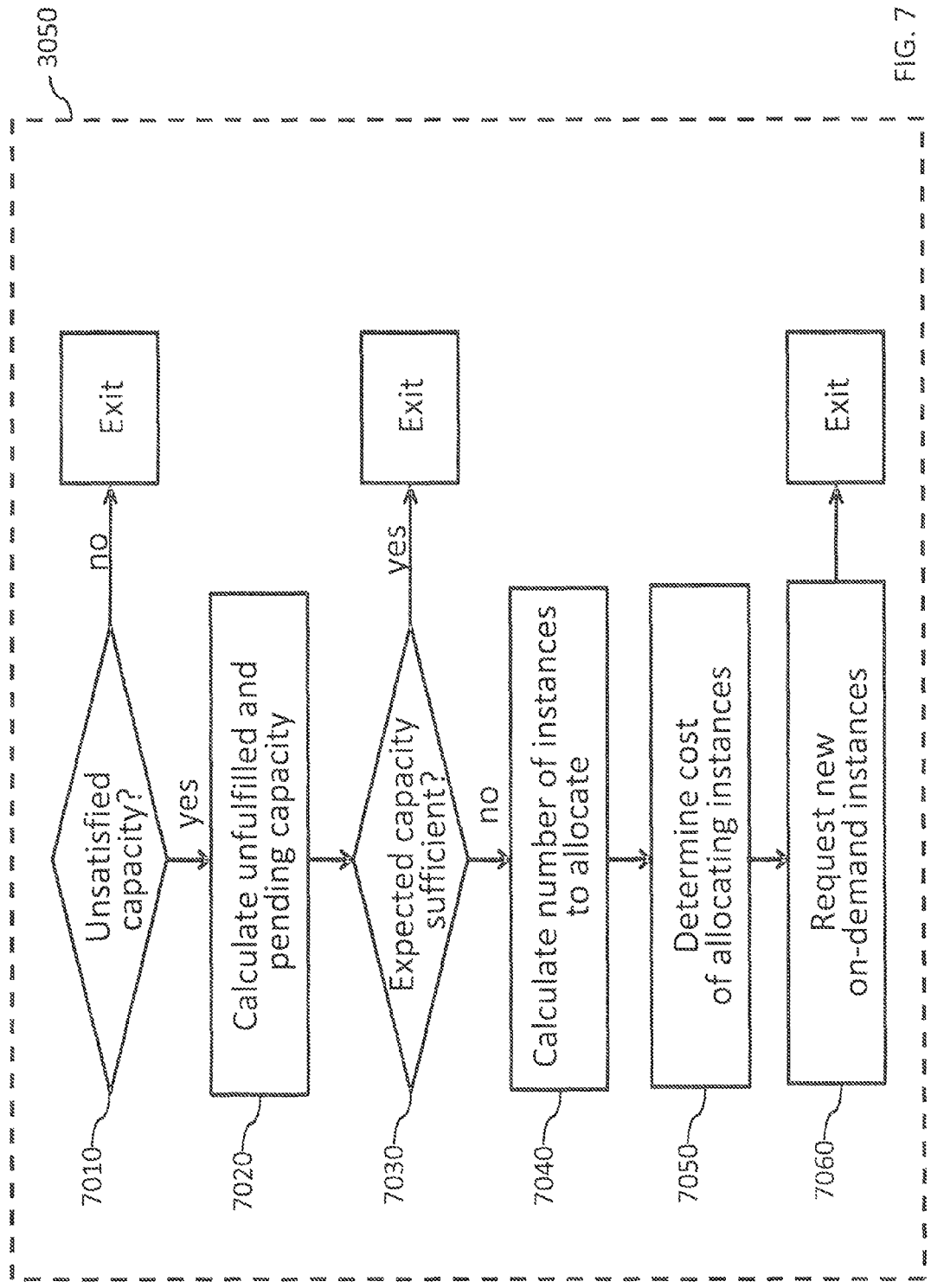

Turning now to FIG. 7, additional details regarding an implementation of scheduler operation 3050 are provided. The routine begins at test 7010, during which the scheduler may use the result of operation 6070 to determine if insufficient processing capacity was reported. If no insufficient processing capacity was reported, the routine terminates, otherwise it advances to operation 7020.

At operation 7020, the scheduler may use the result of operations 4030 and 4040 to determine how many on-demand instances have been requested but have not yet completed the registration process. More specifically, the scheduler may calculate the expected processing capacity which should become available once unfulfilled and pending on-demand resources complete the registration process.

At test 7030, the scheduler may compare the result of operation 6070 with the result of operation 7020. If the expected processing capacity is greater than or equal to the insufficient processing capacity, the routine terminates, otherwise it advances to operation 7040.

At operation 7040, the scheduler may calculate how many additional on-demand instances should be requested. The calculation is based on the difference between the expected processing capacity and the insufficient processing capacity, and based on the capacity each on-demand instance is expected to provide.

At operation 7050, the scheduler may determine the cost of allocating new on-demand instances to absorb unsatisfied workload. It should be appreciated that different mechanisms to obtain cost-efficient on-demand instance are possible. For example, before requesting new on-demand instances, the price of on-demand instances may be compared across multiple cloud computing services 1500. Also, cloud service API 1502 may allow callers to bid for on-demand instances instead of paying a fixed price. If so, bidding may be leveraged to obtain on-demand instances at lower prices. Note that underbidding may result in longer delays between the time an on-demand instance is requested and the time the request is fulfilled. Also, if the bid is too low, the request may never be fulfilled. However, the logic described herein, in particular operations 5020 and 5030, are designed to detect and handle such situations. Also, if scheduler 1401 finds that on-demand instances cannot be obtained quickly enough using bidding, it may automatically increase the bid price, or revert to the fixed price method for a configurable amount of time. Finally, scheduler 1401 may delay allocation of new on-demand instances if there are indications (for example based on historical values) that the current price will decrease within a configurable amount of time.

At operation 7060, the scheduler may use the result of operation 7050 to request allocation of new on-demand instances using cloud service API 1502, after which the routine terminates. As previously described herein, certain constraints such as a particular geographical location may be imposed when requesting on-demand instances.

It should be appreciated that functionality provided by scheduler 1401 may be implemented using different mechanisms than previously described herein. For example, some operations may be executed in a different order, may not be implemented, or may be implemented partially. For example, functionality may be implemented as code running within one or more independent processes, or may be implemented as code running within configuration repository 1403. For example, scheduler 1401 may have direct access to configuration repository 1403, in which case using web service 1402 to access configuration information may not be required. For example, scheduler 1401 may also communicate directly with instances 1404 and 1501, in which case instances may need not poll web service 1402, and the scheduler may need not persist task assignments in configuration repository 1403. For example, multiple instances of scheduler 1401 may be used to improve reliability or performance.

Figure 8:
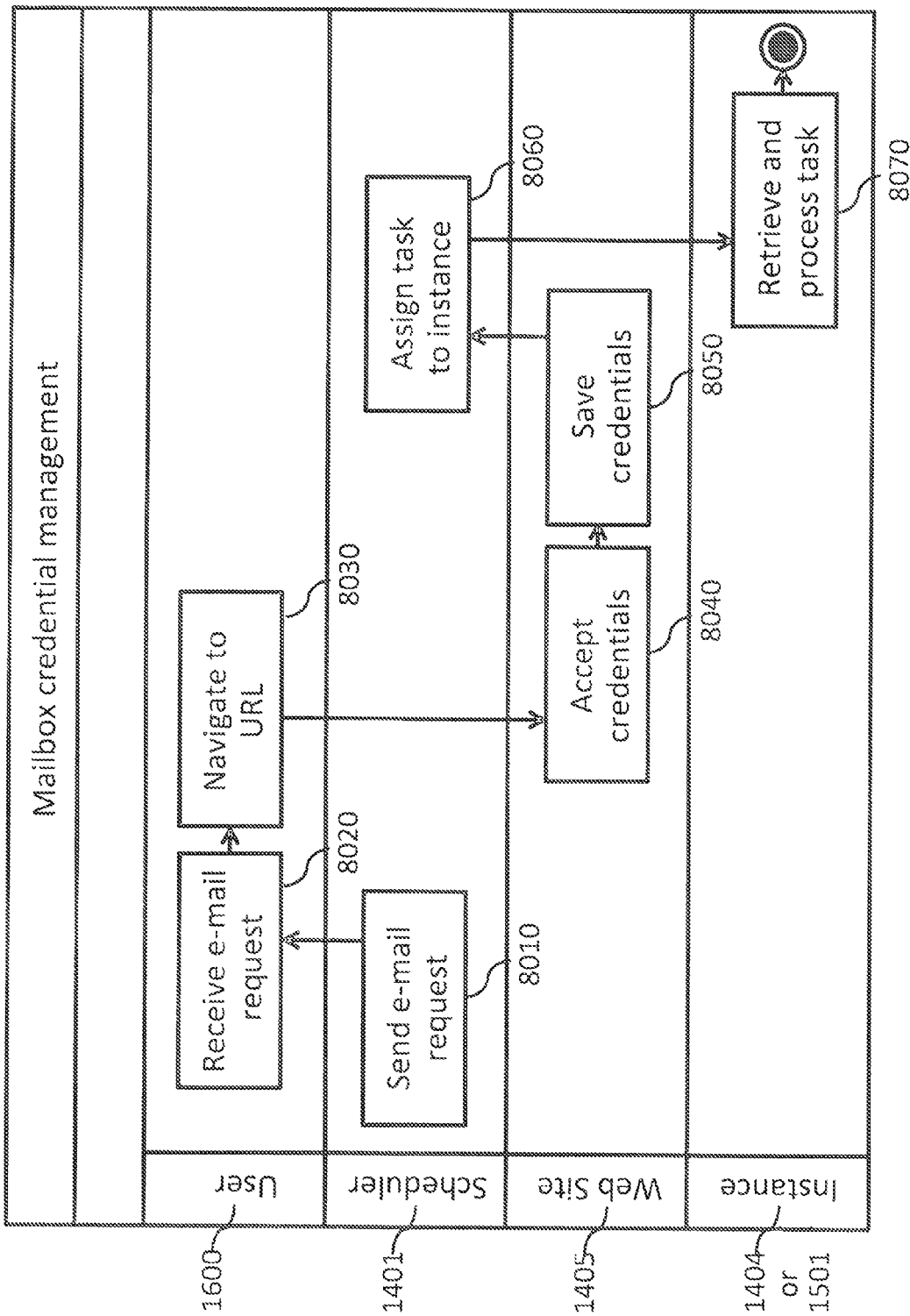
FIG. 8 illustrates a block diagram for providing management of mailbox account credentials in accordance with the invention.

Turning now to FIG. 8, additional details regarding processing of mailbox credentials are provided. At block 8010, scheduler 1401 may find a task for which mailbox credentials are required, but haven't been supplied. Scheduler 1401 may send an e-mail message to mailbox user 1600, including a link to a secure web page on web site 1405. At block 8020, mailbox user 1600 may receive the e-mail message. At block 8030, mailbox user 1600 may click on or navigate to the link, and be presented with a secure web page from web site 1405 requesting mailbox credentials. At block 8040, web site 1405 may accept credentials submitted by mailbox user 1600. At block 8050, web site 1405 may store credentials in configuration repository 1403. At block 8060, scheduler 1401 may process the task again but now find that mailbox credentials are available in configuration repository 1403. Scheduler 1401 may then assign the task to an instance 1404 or 1501. At block 8070, the selected instance 1404 or 1501 may discover that a task has been assigned to it, obtain configuration information including mailbox credentials, and commence synchronization or migration processing.

The advantages of the present invention include, without limitation, that it allows dynamic allocation of computing resources for cost-effective, efficient mailbox synchronization and migration. It also facilitates management by automating the obtainment of mailbox credentials, and by automating the process of scheduling synchronization or migration workload. The invention enables large-scale synchronization or migrations, even with limited local computing resources available or without knowledge of administrative credentials.

In broad embodiment, the present invention is a system for managing physical and logical resources to provide dynamic on-demand processing capacity for a variety of purposes. Further, it will be understood that each block of the processes in the illustrations, and combinations of blocks in the process illustrations, can be implemented by computer program instructions. These program instructions may be provided to a processor and memory device to produce a machine, such as a computer device, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the process block or blocks. The computer program instructions may also cause at least some of the operational steps shown in the blocks of the processes to be performed in parallel. Moreover, some of the steps may also be performed across more than one processor, such as might arise in a multi-processor computer system, such as a plurality of computer devices. In addition, one or more blocks or combinations of blocks in the illustrations may also be performed concurrently with other blocks or combinations of blocks, or even in a different sequence than illustrated without departing from the scope or spirit of the invention.

While the description of the present invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, methods, and examples, but by all embodiments and methods within the scope and spirit of the invention as claimed.

What is claimed as new and desired to be protected by Letters Patent of the United States is:

1. A method comprising:
   obtaining credentials for accessing a plurality of mailbox accounts on a source messaging system, wherein the credentials include administrative credentials, automatically requested user credentials, or a combination thereof;
   dynamically associating computing resources including on-demand instances obtained from one or more cloud service providers for processing copying of information associated with the plurality of mailbox accounts; and
   employing the obtained credentials and the associated computing resources to copy at least some mailbox content associated with each mailbox account from the source messaging system to the destination messaging system, wherein the computing resources are dynamically associated to tasks employed in the copying,
   wherein associating computing resources further comprises prioritizing the computing resources to process the copying of the plurality of identified mailbox accounts based on at least one of cost, geographic location, bandwidth, availability, security, type, or speed.

2. The method of claim 1, further comprising configuring the source messaging system and the destination messaging system for the copying, wherein configuring further comprises determining at least one of a location, messaging system type, and number of mailbox accounts for copying.

3. The method of claim 1, further comprising dynamically obtaining the computing resources including enabling bidding by a third party to dynamically provide computing resources for processing the copying of the plurality of identified mailbox accounts, wherein the bidding is based on at least one of cost, geographic location, bandwidth, availability, security, type, and speed.

4. The method of claim 1, wherein obtaining credentials further comprises requesting a credential for accessing the mailbox account from each user of each mailbox account.

5. The method of claim 1, wherein obtaining credentials further comprises receiving a request for copying from each user of each mailbox account, wherein the request includes at least a credential.

6. The method of claim 1, further comprising providing a status of computing resources employed to process the migration from the source messaging system to the destination messaging system.

7. The method of claim 1, further comprising synchronizing content for the plurality of mailbox accounts that having information copied from the source messaging system to the destination messaging system, wherein the synchronization is based on at least one of a period of time or au event.

8. An apparatus comprising:
a memory component; and
a processing component that is arranged to operate on data to enable actions, the actions comprising:
obtaining credentials for accessing each of a plurality of mailbox accounts on a source
messaging system, wherein the credentials include administrative credentials, automatically requested user credentials, or a combination thereof;
dynamically associating computing resources including on-demand instances obtained from one or more cloud service providers for copying at least some mailbox content associated with the plurality of mailbox accounts; and
employing the obtained credentials and the associated computing resources to copy at least some mailbox content associated with each mailbox account from the source messaging system to the destination messaging system, wherein the computing resources are dynamically associated to tasks employed in the copying,
wherein associating computing resources further comprises prioritizing the computing resources to process the migration of the plurality of mailbox accounts based on at least one of cost, geographic location, bandwidth, availability, security, type, or speed.

9. The apparatus of claim 8, wherein the actions further comprise configuring the arrangement of the source messaging system and the destination messaging system for the copying, and wherein said configuring further comprises determining at least one of a location, messaging system type, and number of the mailbox accounts for copying.

10. The apparatus of claim 8, further comprising dynamically obtaining the computing resources including enabling bidding, by a third party to dynamically provide computing resources for processing the copying of at least some mailbox content associated with the plurality of identified mailbox accounts, wherein the bidding is based on at least one of cost, geographic location, bandwidth, availability, security, type, and speed.

11. The apparatus of claim 8, wherein Obtaining credentials further comprises requesting a credential for accessing the mailbox account from each user of each identified mailbox account.

12. The apparatus of claim 8, wherein obtaining credentials further comprises receiving a request for copying from each user of each mailbox account, wherein the request includes at least a credential.

13. The apparatus of claim 8, further comprising synchronizing content for the plurality of identified mailbox accounts that are migrated from the source messaging system to the destination messaging system, wherein the synchronization is based on at least one of a period of time or an event.

14. A system comprising:
a storage device for storing and managing task and configuration information; and one or more computing devices having at least a scheduler operating using at least one processor, for performing actions using in part the stored task and configuration information, including:
obtaining credentials for accessing each of a plurality of mailbox accounts on a source messaging system, wherein the credentials include administrative credentials, automatically requested user credentials, or a combination thereof;
dynamically associating computing resources including on-demand instances obtained from one or more cloud service providers for processing copying at least some mailbox content associated with the plurality of mailbox accounts; and
employing the obtained credentials and the associated computing resources to copy at least some mailbox content associated with each mailbox account from the source messaging system to the destination messaging system, wherein the computing resources are dynamically associated to tasks employed in the copying,
wherein associating computing resources further comprises prioritizing the computing resources to process the copying of at least some mailbox content associated with of the plurality of mailbox accounts based on at least one of cost, geographic location, bandwidth, availability, security, type, or speed.

15. The system of claim 14, further comprising configuring the arrangement of the source messaging system and the destination messaging system for the copying, wherein said configuring further comprises determining at least one of a location, messaging system type, and number of mailbox accounts for copying.

16. The system of claim 14, further comprising dynamically obtaining the computing resources including enabling bidding by a third party to dynamically provide computing resources for processing the copying of at least some mailbox content associated with the plurality of mailbox accounts, wherein the bidding is based on at least one of cost, geographic location, bandwidth, availability, security, type, and speed.

17. The system of claim 14, wherein obtaining credentials further comprises requesting a credential for accessing the mailbox account from each user of each mailbox account.

18. A method comprising:
providing configuration information regarding a source messaging system and a
destination messaging system to a migration or synchronization system, wherein the configuration information includes administrative credentials, automatically requested user credentials, or a combination thereof; and
submitting mailbox processing tasks to the migration or synchronization system, wherein the migration or synchronization system is separate from the source messaging system, and
wherein the migration or synchronization system is configured to dynamically associate computing resources sufficient to perform the mailbox processing tasks to the mailbox processing tasks, the computing resources including on-demand instances obtained from one or more cloud service providers,
wherein the migration or synchronization system is configured to associate computing resources by prioritizing the computing resources to process the copying of at least some mailbox content associated with of the plurality of mailbox accounts based on at least one of cost, geographic location, bandwidth, availability, security, type, or speed.

19. The method of claim 18, wherein said submitting mailbox processing tasks comprises submitting the mailbox processing tasks using a web site.

20. The method of claim 18, further comprising monitoring status of the mailbox processing tasks using an interface to the migration system.

21. The method of claim 20, wherein the interface comprises a web site.

22. The method of claim 20, wherein the migration system is further configured to obtain mailbox credentials for migrating or synchronizing the plurality of mailbox accounts.

23. The method of claim 1, wherein the copying of information comprises migrating each of the plurality of mailbox accounts from the source messaging system to the destination messaging system.

24. The apparatus of claim 8, wherein copying at least some mailbox content associated with the plurality of mailbox accounts comprises migrating the plurality of mailbox accounts from the source messaging system to the destination messaging system.

25. The method of claim 1, wherein dynamically associating computing resources including on-demand instances obtained from one or more cloud service providers for processing copying of in formation associated with the plurality of mailbox accounts comprises booting an on-demand instance from an image.

26. The apparatus of claim 8, wherein the on-demand instances comprise a physical computer, a virtual computer, or a combination thereof.

27. The apparatus of claim 1, wherein the on-demand instances are configured to run using one or more cloud service APIs.

* * * * *

UNITED STATES PATENT AND TRADEMARK OFFICE
CERTIFICATE OF CORRECTION

PATENT NO. : 8,938,510 B2  
APPLICATION NO. : 12/961268  
DATED : January 20, 2015  
INVENTOR(S) : Dominic Justin Pouzin and Geeman Yip Page 1 of 1

It is certified that error appears in the above-identified patent and that said Letters Patent is hereby corrected as shown below:

|  | Reads | Should Read |
|---|---|---|
| Title Page (73) Assignee | "Bittan Inc., Kirkland, WA (US)" | --BitTitan, Inc., Kirkland, WA (US)-- |

Signed and Sealed this  
Fourteenth Day of July, 2015

Michelle K. Lee  
*Director of the United States Patent and Trademark Office*